United States Patent [19]

Tamaki

[11] 4,210,297

[45] Jul. 1, 1980

[54] TAPE DRIVING SYSTEM FOR A TAPE RECORDER

[75] Inventor: Katsuyuki Tamaki, Yokohama, Japan

[73] Assignee: Tokyo Shibaura Denki Kabushiki Kaisha, Kawasaki, Japan

[21] Appl. No.: 937,547

[22] Filed: Aug. 28, 1978

[30] Foreign Application Priority Data

Aug. 31, 1977 [JP] Japan .............................. 52-103626
Sep. 7, 1977 [JP] Japan .............................. 52-106652
Sep. 7, 1977 [JP] Japan .......................... 52-119456[U]

[51] Int. Cl.² ...................... G11B 15/22; B11B 15/30
[52] U.S. Cl. ................................ 242/201; 242/204; 242/208
[58] Field of Search ............... 242/201, 202, 203, 204, 242/208, 210; 360/85

[56] References Cited

U.S. PATENT DOCUMENTS

| 3,501,111 | 3/1970 | Procop | 242/202 |
| 3,652,030 | 3/1972 | Nakano | 242/201 |
| 3,918,660 | 11/1975 | Takashino | 242/204 |

FOREIGN PATENT DOCUMENTS

| 839464 | 6/1960 | United Kingdom | 242/201 |
| 1188645 | 4/1970 | United Kingdom . | |

Primary Examiner—George F. Mautz
Attorney, Agent, or Firm—Cushman, Darby & Cushman

[57] ABSTRACT

A VTR apparatus includes a supply reel holder and a take-up holder, a take-up tire to be pressed onto the take-up reel holder to transmit a rotating force of a motor through a clutch mechanism and a brake mechanism to apply a brake force to the supply reel holder to stop the travelling of a tape.

6 Claims, 12 Drawing Figures

TAPE DRIVING SYSTEM FOR A TAPE RECORDER

This invention relates to a tape driving system for a tape recorder best suited for a cassette-type video tape recorder, for example.

For this type of video tape recorder, there is known a helical scanning rotating magnetic head type magnetic recording-reproducing VTR in which a tape is passed diagonally round the peripheral surface of a cylindrical tape guide with a rotating magnetic head as mentioned below. When a cassette is set in such system, a supply reel holder brake (hereinafter named as an S-brake) and a take-up reel holder brake (hereinafter named as a T-brake) are released from the contact with supply reel holder and take-up reel holder by means of a switch mechanism. Then a loading mechanism operates to draw out the tape from the cassette and winds it around a tape guide for tape loading. When such tape loading is completed, the S- and T-brakes are again brought into contact with their corresponding reel holders. That is, the tape inside the cassette is drawn out from a supply reel, passed through tension arms, and driven through an angle of approximately 180° along the outer periphery of a drum with a rotating head. Thereafter, the tape is passed through an audio control head, driven between a pinch roller and a capstan at a constant speed, and wound round a take-up reel through a return tape guide. Such a brake is usually constructed by a swingable arm the top of which is provided a pad made of for example, felt.

In the vicinity of the take-up reel holder is a recording and reproducing idler so disposed as to be apart therefrom at a predetermined interval on a usual state and as to be able to come into contact therewith to rotate it upon recording and reproducing states. Further, in the vicinity of the take-up reel holder is a fast feeding idler so arranged as to be able to contact therewith to transmit the rotating force upon a fast feeding state. The fast feeding idler is driven by a motor through a belt, and the recording and reproducing idler is rotated by the fast feeding idler through a belt. Near the supply reel holder and the fast feeding idler is a rewinding idler so disposed as to be able to contact both the supply reel pedestal and the fast feeding idler to transmit the rotation of the fast feeding idler to the supply reel holder.

With such construction as aforesaid, the cassette tape driving system, in recording-reproducing fast feeding, and rewinding modes, operates as follows. That is, when a recording or reproducing button is depressed for the recording-reproducing operation, the T- and S-brakes are released from the contact with the reel holders, the motor starts, the recording and reproducing idler is pressed against the take-up reel holder, and the tape is wound round the take-up reel mounted on the holder.

When a fast-feed button is depressed for the fast feeding operation, the S- and T-brakes are released, the fast feeding idler is pressed against the take-up reel holder, and the tape is wound round the take-up reel at a high speed by means of the torque of the fast feeding idler.

Meanwhile, when a rewinding button is depressed for the rewinding operation, the S- and T-brakes are released, the rewinding idler is pressed against the supply reel holder and the fast feeding idler, the turning force of the fast feeding idler is transmitted to the supply reel holder through the rewinding idler, and the tape is wound round the supply reel at a high speed. When a stop button is depressed after the operation in each of the aforesaid modes, the idlers are released from the reel holders, the S- and T-brakes are brought into contact with their corresponding reel holders, and the tape is stopped from running. Hereupon, the mutual operating timing of respective brakes in such brake mechanism is a matter of great significance. If the T-brake touches the take-up reel holder too early when the brake is applied while the tape is running on the take-up reel holder side then the tape will be let out from the supply reel side in a moment when the S-brake is driven to be contacted with the supply reel holder, thereby slackening in the tape path. Also if the S-brake touches the supply reel holder too early when the brake is applied while the tape is running on the supply-reel holder side, there will be caused slackening of the tape in the same manner as aforesaid. Such slackening of the tape in the path may deal the VTR a fatal blow. That is, if the tape slackens in the tape path, it will run off the tape guide to come in touch with other parts of the system when proceeding to the next step, thereby suffering scratches or breakage. In order to prevent the abnormal running of the tape due to such slackening, the prior art construction requires highly close adjusting and setting of the braking timing and hence high precision in design and workmanship.

Besides the braking timing, the brake pressure has a great influence on the performance of such brake mechanism. Namely, the difference between the brake pressures on each side at assembly and/or a secular change in the coefficient of friction of a brake pad may lead to the varied braking timings as aforesaid, thereby causing the slackening of the tape. Also in view of this, there will be required highly accurate assembly and proper selection of the brake pad material.

Further, in such brake mechanism of a pad-type, the tape may broken by an extremely high brake pad pressure on the supply reel holder coupled with a turning force remaining on the take-up reel holder side, as well as by the slackening.

The object of this invention is to provide a tape driving system of a tape recorder capable of eliminating the aforesaid conventional defects and achieving desirably timed braking of supply and take-up reel holders.

This invention can be more fully understood from the following detailed description when taken in conjunction with the accompanying drawings, in which.

Now there will be described an embodiment of this invention with reference to the accompanying drawings.

Figure 1:
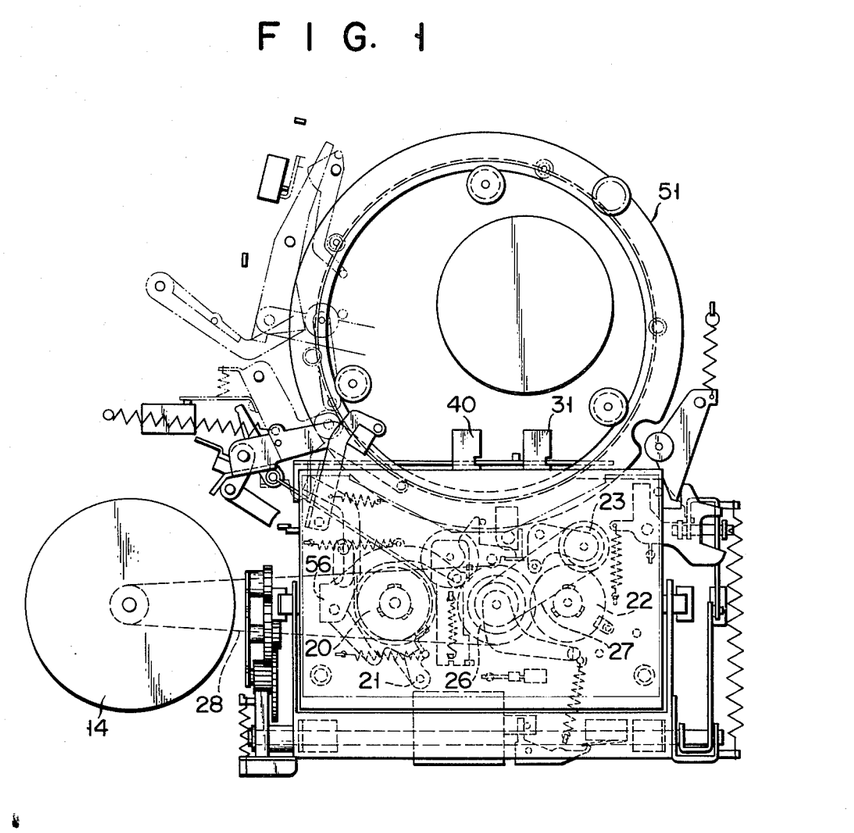
FIG. 1 is a plan view of a tape driving system for a video tape recorder according to an embodiment of this invention.
Figure 2:
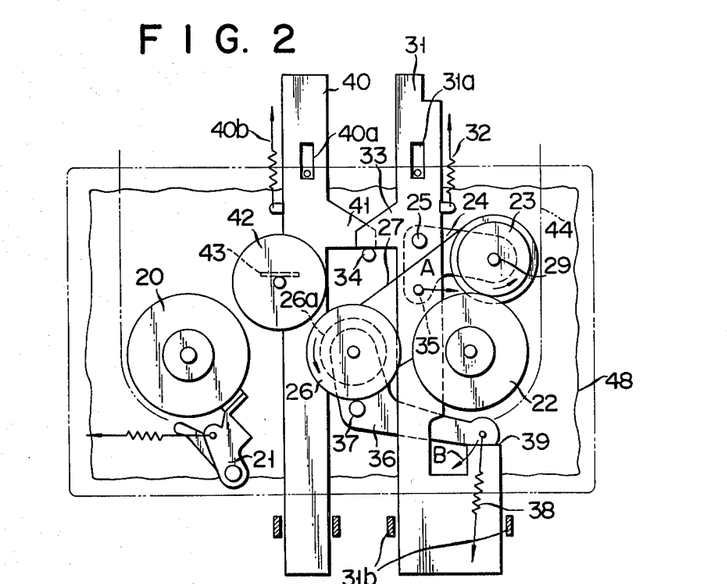
FIG. 2 is an enlarged plan view of a tape winding mechanism of the tape driving system as shown in FIG. 1.
Figures 3A, 3B, 4:
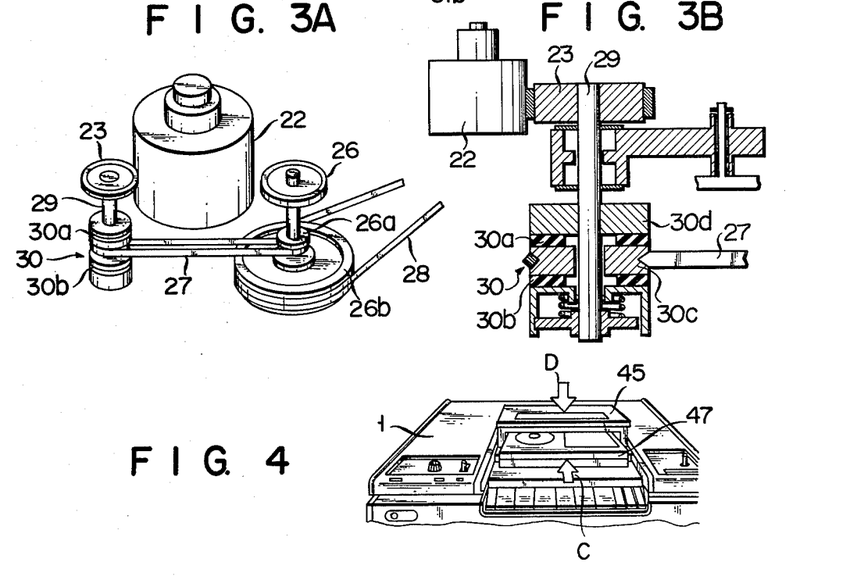
FIGS. 3A and 3B are a perspective view and a sectional view showing a take-up reel holder and driving members therefor.
FIG. 4 is a perspective view of a bucket with a cassette tape inserted therein.

FIGS. 1 and 2 show the whole and the main driving parts of the cassette tape driving mechanism, respectively, wherein FIG. 2 shows a state in which a cassette tape has been loaded by means of a loading mechanism. Being a fundamental construction, the construction of FIG. 2 will be described first, while the mechanism of the cassette setting and tape arrangement will be mentioned later. In FIG. 2, numeral 20 denotes a supply reel holder or pedestal rotatably supported by a base 48, a pad- or shoe-type supply reel holder brake (S-brake) 21 being pressed against the reel holder 20. The S-brake 21 operates in such a manner that a braking state may be released by means of a push-button type interlocking mechanism as mentioned later in recording-reproducing, fast-feed, and rewinding modes. Such braking operation will later be described in detail. A take-up reel holder or pedestal 22 is rotatably supported by the base at a predetermined distance from the supply reel holder 20. Pressed against the take-up reel holder 22 is take-up tire 23 located in the vicinity thereof and coupled to a clutch mechanism. The tire 23 is rotatably borne on one end of a first L-shaped lever 24 by means of a shaft 29, the middle portion of the lever 24 being pivotally mounted on the base 48. The lever 24 may be rocked by a driving mechanism as mentioned later, and thus be allowed to leave the take-up reel holder 22. Mounted on the shaft 29 of the take-up tire 23, as shown in FIGS. 3A and 3B, is a clutch mechanism 30 which is formed of upper and lower friction members 30a, 30b and a pulley 30c with both sides contacted with friction members. The upper frictional member 30a is attracted to another pulley 30d fixed to the shaft 29. The friction members 30a, 30b, for example, are so designed as to slip under a force more than 140 to 160 gcm with the take-up tire 23 stopped. The take-up tire 23 can be rotated by a turning force transmitted by means of a belt 27 engaged with the pulley 30c, via the clutch mechanism 30. The belt 27 is passed round a small pulley 26a fixed to the same shaft of a fast-feed drive tire 26. A large pulley 26b, which is fixed to the same shaft, is rotatably mounted on one end of a second L-shaped lever 36 the middle portion of which is pivotally mounted on a fulcrum 37. Between the pulley 26b and a reel drive motor 14 stretches a belt 28 as shown in FIG. 1. The other end of the lever 36 is connected with one end of a tension spring 38 with the other end borne on the base. Thus, the second lever 36 is urged to rock clockwise or in the direction of arrow B. When the lever 36 is rocked in the direction of arrow B, the fast-feed drive tire 26 is pressed against the take-up reel holder 22 for the fast-feed operation. Against the other end of the lever 36 abuts the end face or stopper portion 39 of a projection formed at the forward end of a first-feed slide 31 which may be slided by depressing a fast-feed button (not shown), whereby the rocking of the lever 36 is restricted. The slide plate 31 can slide back and forth with a pin on the base inserted in a slot 31a formed along the longitudinal direction of the slide plate 31 while the plate 31 guided with a pair of projections 31b. Connected between the slide plate 31 and the base is a tension spring 32, which pulls the slide plate 31 backward or upward as in FIG. 2. Further, a cam 33 protrudes horizontally from the slide plate 31, having its front engaging a pin 34 which will afterwards be described in detail.

Between the feed reel holder 20 and the fast-feed drive tire 26 is a rewinding idler 42 disposed at equal distances therefrom so as to be able to slide back and forth over the base. A rewinding slide plate 40 is disposed in parallel with the fast-feed slide plate 31 so as to be able to slide back and forth over the base. A cam 43 vertically protruding from the slide plate 40 hits against the rewinding idler 42. The slide plate 40 is provided with a horizontally extending cam 41, the front of which also engages the pin 34. In the longitudinal sliding, the slide plate 40 is guided by means of a slot 40a formed along the longitudinal direction of the plate 40 and a pin protruding from the base into the slot 40a. Between the slide plate 40 and the base stretches a tension spring 40b, which pulls the slide plate 40 backward as shown in FIG. 2. When a rewinding button (not shown) is depressed, the slide plate 40 is slided forward against the spring 40b to push the pin 34 and the rewinding idler 42 forward by means of the cams 41 and 43, respectively, thereby bringing the rewinding idler 42 into contact with both the supply reel holder 20 and the fast-feed drive tire 26. Thus, the turning force of the fast-feed drive tire 26 is transmitted to the supply reel holder 20 through the rewinding idler 42.

When the pin 34 is moved forward by the fast-feed slide plate 31 or the rewinding slide plate 40 (this will be described later with reference to FIG. 9), the L-shaped lever 24 is rocked in the direction of arrow A through a pin 35, and the take-up tire 23 is removed from the take-up reel holder 22. Further, the forward shift of the pin 34 removes the S-brake 21 from the supply reel holder 20 by means of a mechanism as mentioned later, thereby releasing the supply reel holder 20 from braking.

After the fast-feed button is depressed, the fast-feed slide plate 31 is kept in the shifted position by a lock mechanism (not shown) to maintain each of the aforesaid operating states, while the motor revolves for the fast-feed mode. Thereafter, the fast-feed slide plate 31 is released from such position by a stop mode to be restored to the position of FIG. 2.

The cassette tape driving system of the invention, constructed as aforesaid operates in the recording-reproducing, fast-feed, rewinding, and stop modes as follows.

When a recording or reproducing button is first depressed for the recording reproducing mode in the state as illustrated, the S-brake 21 is released by a lever, and the reel drive motor 14 is caused to rotate. Consequently, the turning force is transmitted from the fast-feed drive tire 26 to the take-up tire 23 and the take-up reel holder 22, and a tape 44 travels at a constant speed. Subsequently, when a stop button is depressed, the motor 14 is disconnected from the power supply, and the S-brake 21 operates to brake the supply reel holder 20. As may be seen from the above description, the construction of this invention differs from the conventional one in that it includes only a single reel holder brake on the supply reel holder side. It is requisite to the invention that the take-up reel holder 22 should be accompanied with no brake and be pressed by the take-up tire 23 with a built-in clutch even in the stop mode.

That is, though disconnected from the power supply by depressing the stop button, the motor will go on rotating a while by the force of inertia. The take-up tire 23, which is subject to the turning force from the fast-feed drive tire 26, will also continue to rotate meantime. Accordingly, the take-up reel holder 22 is subjected to the turning force in the direction to wind up the tape 44. Namely, when the supply reel holder 20 is braked, the tape 44 on the take-up reel holder 22 side is always forced to be wound while the motor maintains the force of inertia. If the tape 44 drawn out from the supply reel holder 20 side is steady (or tight) in its course or tape path, the take-up tire 23 will be slipped by the clutch mechanism, whereby the tape 44 will not be pulled by any larger force than the frictional force of the clutch mechanism. Thus, the tape 44 may be protected from breakage by suitably considering the level of such frictional force. Subsequently, when the fast-feed or rewinding button is depressed for the fast-feed or rewinding operation, the fast-feed slide plate 40 operates to attain the fast-feed or rewinding mode as aforesaid.

When the stop button is depressed during the fast-feed mode, the motor 14 is disconnected from the power supply, the brake 21 is pressed against the supply reel holder 20 by the return of the fast-feed slide plate 31, the fast-feed drive tire 26 is removed from the take-up reel holder 22, and the take-up tire 23 is pressed against the take-up reel holder 22. Like the aforementioned case of the stop mode after the recording-reproducing mode, the take-up tire 23 gives turning force to the take-up reel holder 22 while the motor maintains the force of inertia, i.e., in the direction to wind up the tape 44.

Here the critical point lies in a case where the operating timing of the supply reel holder brake 21 for the supply reel holder 20, with the stop button depressed by way of example, misses the time when the take-up tire 23 is pressed against the take-up reel holder 22.

If the operation of the supplied reel holder brake 21 is preceded by the pressing of the take-up tire 23, the tape 44 will slacken in the tape path. The take-up tire 23, however, is subject to the turning force attributable to the force of inertia of the motor at the depression of the stop button, so that the turning force in the winding direction is transmitted to the take-up reel holder 22 since the take-up tire 23 is pressed against the take-up reel holder 22, whereby the tape 44 is wound up. Since the tape 44, therefore, continues to be wound while the supply reel holder brake 21 is operating, there will be caused no slackening in the tape path. After absorbing the slack of the tape will never be subjected to any force larger than the frictional force of the clutch mechanism.

On the other hand, if the supply reel holder brake 21 operates at an earlier point of time, there will be caused no such slackening of the tape.

When the stop button is depressed during the rewinding mode, the tape will slacken if the supply reel holder brake 21 is applied earlier than the pressing of the take-up tire 23. Although such slackening is caused, however, the take-up reel holder 22 is rotated by the force of inertia of the take-up tire 23, the tape 44 is wound on the take-up reel holder 22 side, and thus the slackening of the tape may substantially be absorbed without delay.

Now there will be described the manners of cassette setting and tape arrangement in the aforementioned fundamental construction.

Figure 5:
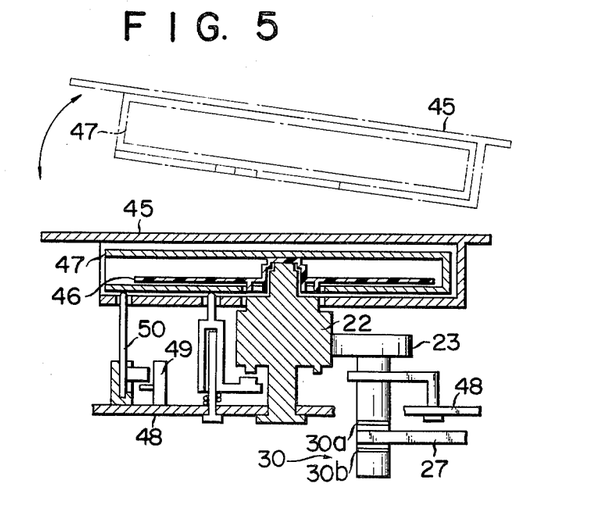
FIG. 5 is a sectional view showing the bucket at the cassette insertion.

As shown in FIGS. 4 and 5, a cassette 47 containing a tape wound round a reel 46 is inserted along the direction of arrow C into an opening of a bucket 45 which protrudes a little above a VTR body 1. By depressing the bucket 45 in the direction of arrow D, the cassette 47 is mounted on the reel holders, each reel engaging each reel holder. The VTR body 1 is provided with a microswitch to detect that the cassette 47 has been set in a satisfactory manner. That is, the mounting of the cassette 47 causes a slide pin 50, which faces a switch contact of a microswitch 49 on the base 48, to come into contact with the under surface of the cassette 47 to be forced down, thereby turning the switch on. Also, there is another switch (not shown) to detect the complete loading of the bucket 45 by means of a downward shift of the bucket 45.

Figure 6:
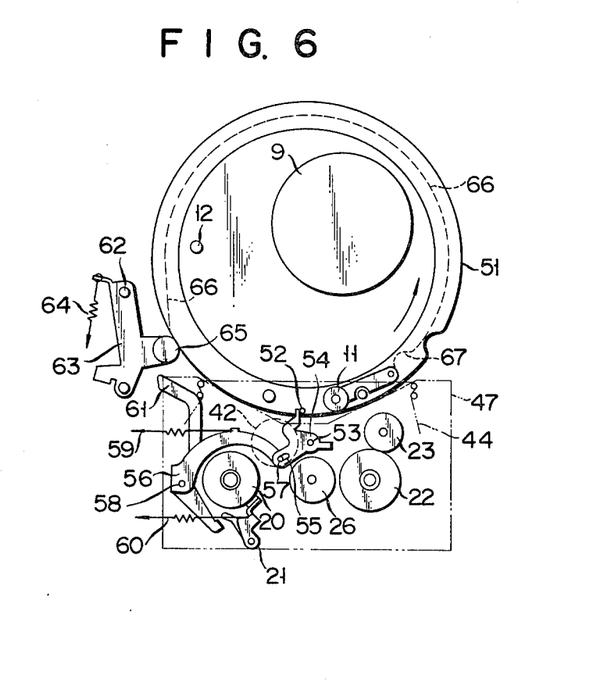
FIG. 6 is a plan view showing the tape winding mechanism and a tape loading mechanism in the non-operating state.
Figure 7:
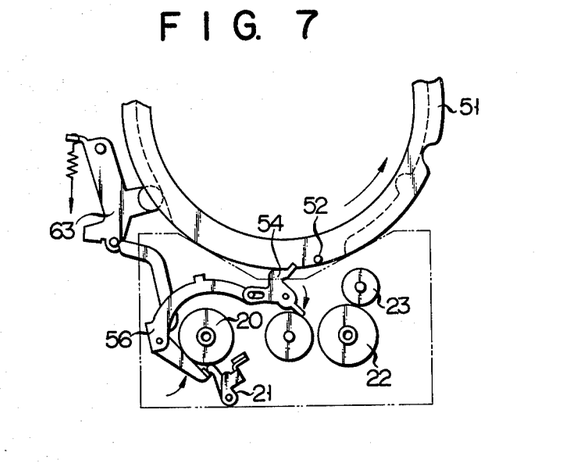
FIG. 7 is a plan view showing part of FIG. 6 in which the loading mechanism starts to be driven.
Figure 8:
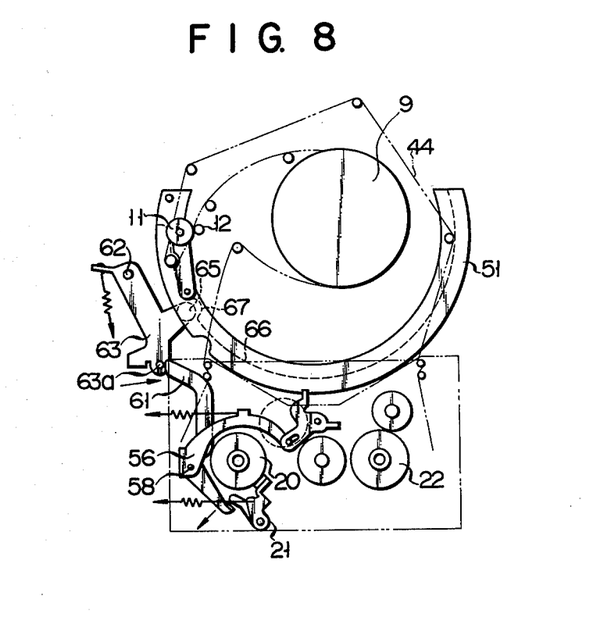
FIG. 8 is a plan view showing the loading mechanism which is finishing its loading operating.

When both these switches are turned on, the non-operating state of FIG. 6 is switched over to the operating state of FIG. 8 via the state as shown in FIG. 7. That is, a loading drive motor to rotate a loading plate 51 for passing the tape round the peripheral surface of a cylindrical tape guide 9 with a rotating magnetic head is started, and thus a gear (not shown) engaging the loading plate 51 rotates the loading plate 51 in the forward direction or counterclockwise direction as in FIG. 6.

With the loading plate 51 interlocks a lever mechanism for releasing the brake 21, whereby the tape will be drawn out from the supply reel holder 20 side, accompanying the rotating action. A pin 52 is mounted on the loading plate 51. In the non-operating state as shown in FIG. 6, the pin 52 is touched by a first arm of a third lever 54 with three radially extending arms which rocks round a lever fulcrum 53, the first arm being subject to the biasing force of a spring as mentioned later. The second arm of the third lever 54 is provided with a slot 55, in which a pin 57 on one end of a fourth lever 56 is slidably fitted. The fourth lever 56, which is of a crescent shape, rocks round a lever fulcrum 58, applying a biasing force to the first arm of the third lever 54 by means of a tension spring 59 stretched between the lever 56 and the base through the slot 55 and pin 57, so that the first arm may touch the pin 52 of the loading plate 51. The other end of the fourth lever 56 faces the supply reel holder brake 21. In order to brake the supply reel holder 20 in this non-operating state, the supply reel holder brake 21 is so urged that its shoe may press on the reel holder 20. While facing the supply reel holder brake 21, the other end of the fourth lever 56 never applies the urging force of the spring 59 to the brake 21. From the fourth lever 56 protrudes an arm 61 which rocks simultaneously with the lever 56 round the fulcrum 58. In the vicinity of the tip end of the arm 61, there is disposed a fifth lever 63 having its tip end bifurcated and the base end pivotally mounted on a lever fulcrum 62, the fifth lever 63 being subject to the biasing force of a tension spring 64 so as to rock in a counterclockwise direction round the fulcrum 62. A roller 65 is rotatably borne on one branch of the bifurcate tip end of the fifth lever 63, urged by the tension spring 64 to press on the loading plate 51 so as to go along the outer circumferential track of the loading plate 51. On the peripheral side face of the loading plate 51, there is formed a cam groove 66 on which the roller 65 presses to rock the fifth lever 63 round the fulcrum 62. The cam groove 66 is so formed that one end of the fifth lever 63 may face the tip end of the arm 61 at a predetermined space while the roller 65 is pressing on the groove 66 in the nonoperating state of FIG. 6, and that the fifth lever 63 may be rocked by the spring 64 to rock the arm 61 as the roller 65 is fitted in a deep portion 67 of the cam groove 66, the other branch of the bifurcate tip end of the lever 63 pressing on the tip end of the arm 61.

In the tape driving system, constructed as aforesaid, the operations at loading are as follows. That is, the cassette tape 47 is put in the bucket (FIG. 4) and so set as to engage the reel holders 20 and 22, which is detected by means of the aforementioned switch 49 and another. Then, a loading drive motor for driving the loading plate 51 is switched on, a pinch roller 11 and the pin 52 of the loading plate 51 draw out the tape 44 from the cassette 47, and the loading plate 51 starts turning in the direction of arrow to pass the tape 44 through the tape path. By such turning of the loading plate 51, as shown in FIG. 7, the pin 52 is removed from the third lever 54, which, released from the engagement with the pin 52, is rocked clockwise. Consequently, the other end of the fourth lever 56 presses on the opposite face of the brake 21, thereby removing the supply reel holder brake 21 from the supply reel holder 20. Since the reel drive motor for turning the take-up tire 23 has not been energized by this time, the take-up tire 23 will never turn, pressed against the take-up reel holder 22. That is, the take-up reel holder 22 is subject to the braking force of the take-up tire 23. Accordingly, at time of tape loading, the tape is drawn out from the supply reel on the supply reel holder 20 side to a length required for the loading.

FIG. 8 shows a state where the tape loading is finished. With the loading plate 51 kept in the loading-over position, the roller 65 of the fifth lever 63 is fitted in the deep portion 67 of the cam groove 66 of the loading plate 51, thereby rocking counter-clockwise round the fulcrum 62. Further, one branch of the bifurcate tip end of the fifth lever 63 pushes the tip end of the arm 61 in the direction as indicated by arrow, whereby the fourth lever 56 also rocks clockwise round the fulcrum 58. Then, the other end of the fourth lever 56 is released from the supply reel holder brake 21, which is pressed against the supply reel holder 20 to brake it. Thus, the supply reel holder 20 is stopped to prevent an excessive portion of the tape from being let out after completion of the loading.

By this rocking of the fifth lever 63 at the end of the loading, a tape tension brake mechanism as mentioned later may also be brought into the operating position.

Subsequently, when the recording or reproducing button is depressed in the loading-over state of FIG. 8, the operation slide plate is slided, thereby releasing the supply reel holder brake 21, the pinch roller 11 is pressed against a capstan 12, and the drive motor is rotated to turn the take-up tire 23, rotating magnetic head, and the capstan.

Thus, the tape runs at a constant speed for the recording-reproducing operation.

Figure 9:
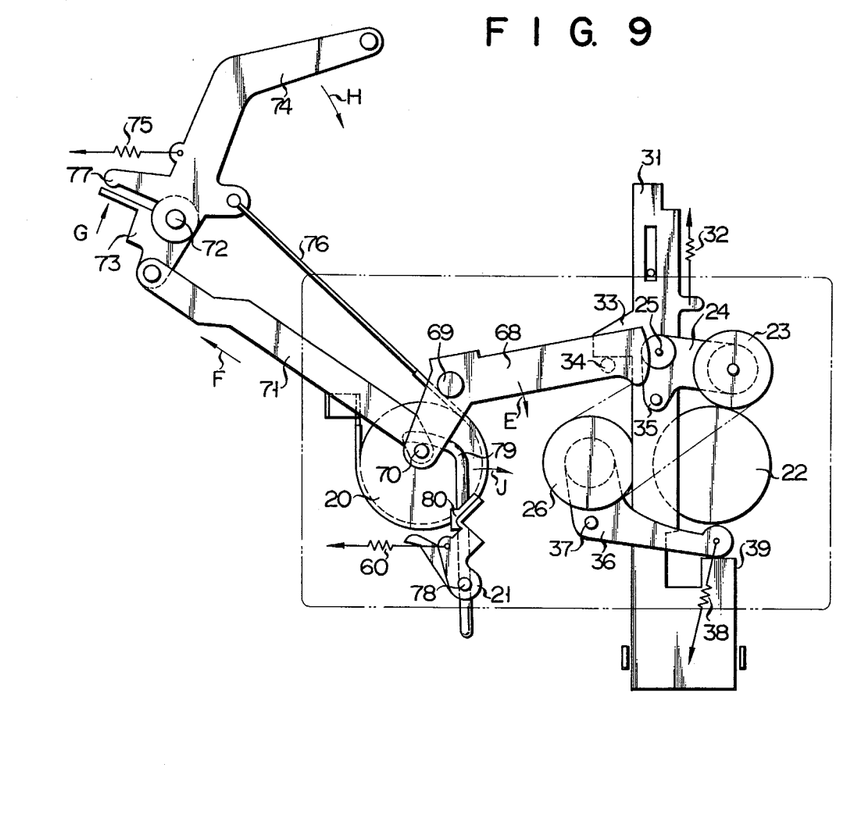
FIG. 9 is a plan view showing a brake mechanism in a fast-feed mode.

Referring now to FIG. 9, there will be described the operations in the fast-feed and rewinding modes.

When the fast-feed button is depressed and the fast-feed slide plate 31 is slided downward as illustrated, the pin 34 hitting against the cam 33 of the slide plate 31 is pushed. As a result, a sixth lever 68, with the pin 34 extended in one end thereof, is rocked round a fulcrum 69 in the direction of arrow E. The other end of the lever 68, which is pivotally mounted on one end of an arm 71 by means of a pin 70, is rocked clockwise, and the arm 71 is moved in the direction of arrow F. Pivotally mounted on the other end of the arm 71 is one end of a lever 73 rocking round a fulcrum 72, the lever 73 rocking in the direction of arrow G in response to the shift of the arm 71 in the direction F. A tension arm 74 is rotatably mounted on a fulcrum 72 of the lever 73, and is subjected to the biasing force of a spring 75 in a direction to induce a band brake 76 wound round the supply reel holder 20 always to brake the supply reel holder 20. An extending end of the lever 73 faces a cam 77 of the tension arm 74, thrusting the cam 77 clockwise against the spring 75 in response to the rocking of the lever 73 in the direction of arrow G. Consequently, the tension arm 74 rocks round the fulcrum 72 in the direction of arrow H, thereby releasing the supply reel holder 20 from the band brake 76.

A bent end of a lever 79 pivotally mounted on a fulcrum 78 of the supply reel holder brake 21 hits against the pin 70 which bears the other end of the lever 68 and one end of the arm 71. Accompanying the rocking of the lever 68 in the direction of arrow E, the lever 79 rocks round the fulcrum 78 in the direction of arrow J. On the lever 79 in integrally provided a cam 80 facing the shoe of the brake 21. In response to the rocking of the lever 79, the cam 80 pushes the supply reel holder brake 21 against a spring 60 to remove the brake 21 from the supply reel holder 20. Thus, by sliding the fast-feed slide plate 31, the supply reel holder brake 21 and the band brake 76 are released for the fast-feed operation.

In the rewinding mode, the pin 34 is moved by the rewinding slide plate 31 as already described with reference to FIG. 2, and the brakes are released in just the same manner as in the fast-feed mode. As for the stop mode after each of those modes, it has already been mentioned herein.

Now there will be described the so-called unloading operation to put back the loaded tape in the cassette by depressing an EJECT button, and operations to remove the bucket and draw out the cassette.

Figure 10:
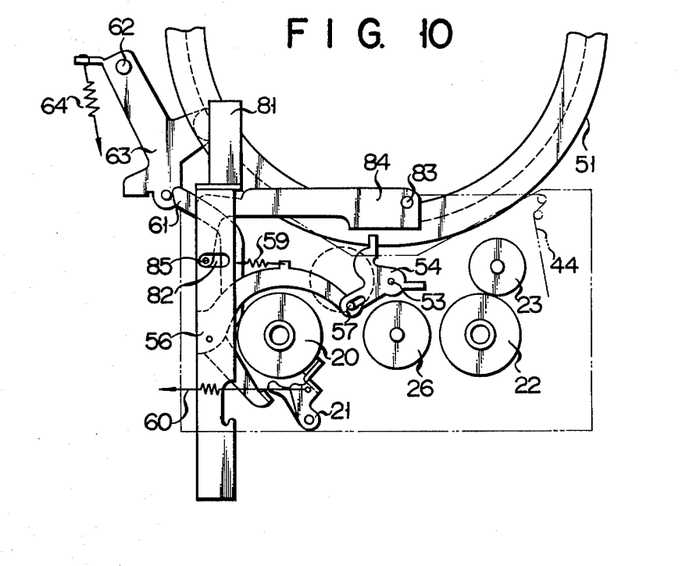
FIGS. 10 and 11 are plan views respectively showing varied states of a driving mechanism for unloading the tape in conjunction with an ejection lever.
Figure 11:
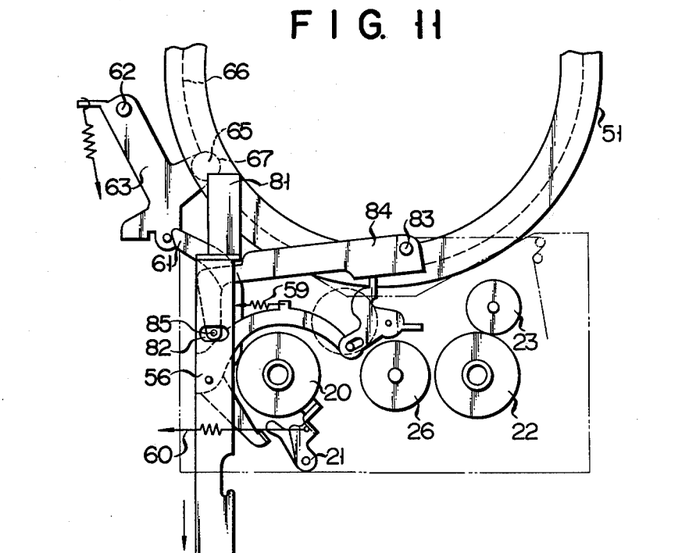

FIGS. 10 and 11 show varied states of operation in the EJECT mode. In FIG. 10, which shows the same state as in FIG. 8, there is shown an EJECT slide plate 81 which may be slided downward as illustrated by pushing the EJECT button. In the middle of the slide plate 81 is a slot 82 extending at right angles to the longitudinal direction of the slide plate 81, while a pin 85 on the tip end of an L-shaped lever 84 is slidably inserted in the slot 82, the lever 84 rocking round a fulcrum 83. The pin 85 faces the side of the arm 61, which rocks with the fourth lever 56, at a space therefrom, as shown in FIG. 10. When the EJECT button is depressed, the slide plate 81 is slided downward as shown in FIG. 11, whereby the pin 85 engaging the slot 82 of the slide plate 81 will move along the slot 82 to press on the side of the arm 61. When the slide of the slide plate 81 is completed, the fifth lever 63 is released from the engagement with the loading plate 51, and the loading drive motor for the loading plate 51 is switched on to turn the loading plate 51 in the reverse direction for unloading. Then, the reel drive motor 14 for the take-up tire 23 is also switched on to cause the take-up tire 23 to rotate the take-up reel holder 22, and the unloaded tape in the tape path is wound round the take-up reel. That is, accompanying the slide of the slide plate 81, the pin 85 hits against the arm 61, thereby preventing the braking state from being released when the roller 65 of the fifth lever 63 has got away from the deep portion 67 of the cam groove 66 to resume the position of FIG. 7 so that the urging force of one end of the fifth lever 63 on the cam 61 is removed. Thus, in unloading, the excessive feed of the tape from the supply reel side may be avoided.

Furthermore, on completion of the unloading by means of the loading plate 51, a means for removing the bucket (not shown) operates to lift the bucket 45, allowing the cassette 47 to be taken out.

What is claimed is:

1. A tape driving system for operating in at least recording-reproduction, stop and fast-forward modes comprising:

a base;

a supply reel holder rotatably supported on the base;

a take-up reel holder rotatably supported on the base;

a fast feed drive tire;

means for pressing the fast feed drive tire against the take-up reel holder during the fast-forward mode and not the stop mode;

means for rotating the fast feed drive tire in at least the fast-forward mode;

means for driving the take-up reel holder including:

a motor, a take-up tire, means for pressing the take-up tire against the take-up reel holder during the recording-reproduction and stop modes, and clutch means for transmitting force from the motor to the take-up tire, the clutch means including a first portion operatively connected to the motor, a second portion frictionally engaged with the first portion and operatively connected to the take-up tire, so that force is transmitted from the first portion to the second portion and the force applied to the second portion is limited to a predetermined maximum; and means for braking the supply reel holder during the stop mode, the clutch means preventing excessive force from being applied to the take-up reel during the recording-reproduction mode, and the inertia of the motor, clutch means, pressing means, take-up tire and braking means cooperating to prevent slack in the tape in the stop mode.

2. A tape driving system according to claim 1 further comprising a fast-feed slide plate slidably disposed on said base, a first lever mechanism for removing said fast-feed drive tire from said take-up reel holder in response to a slide of said slide plate, and a second lever mechanism for pressing said take-up tire against said take-up reel holder in response to the slide of said slide plate.

3. A tape driving system according to claim 2 further comprising, an operation stop mechanism including means for moving said first and second lever mechanisms when operated during said fast-feed operation, whereby said take-up tire will be pressed against said take-up reel holder, and whereby said fast-feed drive tire will be removed from said take-up reel holder.

4. A tape driving system according to claim 3, wherein said first and second portions of said clutch means are coaxial friction clutches frictionally engaging each other, and said clutch means further includes a pulley fixed to the same shaft of said fast-feed drive tire and a belt stretched between said pulley and said first-portion.

5. A tape driving system according to claim 1 further comprising a rewinding idler and a rewinding slide plate pressing said rewinding idler against said supply reel holder and fast-feed drive tire to rotate said rewinding idler by means of said drive tire and removing said take-up tire from said take-up reel holder.

6. A tape driving system according to claims 2, 3, 4, 5 or 1 further comprising a loading plate for guiding a tape onto the peripheral surface of a cylindrical tape guide with a rotating magnetic head by rotation from a first position to a second position, a lever mechanism for releasing said brake means from said supply reel holder in response to said rotation of the loading plate, a lever mechanism engaging said loading plate and operated by said loading plate when said loading plate reaches said second position, whereby said supply reel holder will be stopped by means of said brake means, and a means for shifting said loading plate from said second position to said first position with said supply reel holder kept stopped and rotating said take-up reel holder to achieve tape winding.

* * * * *